United States Patent [19]

Overton

[11] Patent Number: 5,051,634
[45] Date of Patent: Sep. 24, 1991

[54] MOTOR STATOR HEAT SPIKE
[75] Inventor: Bernard P. Overton, Blacksburg, Va.
[73] Assignee: Kollmorgen Corporation, Simsbury, Conn.
[21] Appl. No.: 373,387
[22] Filed: Jun. 29, 1989
[51] Int. Cl.⁵ ............................................. H02K 5/18
[52] U.S. Cl. ..................................... 310/64; 310/216
[58] Field of Search .................. 310/64, 65, 186, 208, 310/216, 217, 218, 254

[56] References Cited

U.S. PATENT DOCUMENTS

| | | | |
|---|---|---|---|
| 1,238,213 | 8/1917 | Stuart | 310/188 |
| 2,172,191 | 9/1939 | Denman | 310/216 |
| 2,556,013 | 6/1951 | Thomas | 310/217 |
| 3,130,337 | 4/1964 | Stoller | 310/218 |
| 3,495,114 | 2/1970 | Kazansky | 310/179 |
| 3,671,787 | 6/1972 | Herron | 310/218 |
| 4,358,692 | 11/1982 | Hallerback | 310/59 |

Primary Examiner—Steven L. Stephan
Assistant Examiner—D. L. Rebsch
Attorney, Agent, or Firm—Morgan & Finnegan

[57] ABSTRACT

An electric motor includes a heat spike within the stator slots which extends radially inward from the stator back iron into the slot between the stator teeth. The heat spike, placed within the stator slots, reduces the heat path length and increases the heat transfer areas to the iron. Together, these allow the winding heat to dissipate quicker, and thereby, reduce the hotspot temperature and improve the motor's load rating.

3 Claims, 2 Drawing Sheets

MOTOR STATOR HEAT SPIKE

FIELD OF THE INVENTION

The present invention relates to heat transfer within electric motors. More particularly, the present invention relates to the transfer of heat from the windings to the motor housing.

BACKGROUND OF THE INVENTION

Electric motor designs often require that the stator have large-area slots (where the width of the slot is greater than the radial length, or depth, of the slot). A conventional slotted stator without heat spikes is shown in FIG. 4. The stator structure includes a cylindrical outer shell 40 made of laminated silicon steel. This shell provides the outer back iron for the motor. The stator shown has six teeth 42 and therefore it has six slots 44. The six stator teeth 42 are equally spaced around the circumference of the stator shell 40. The stator teeth 42 extend radially inward from the stator shell Since the stator teeth 42 are equally spaced they define six slots 44 of approximately equal area. Within the stator slots, electrical conductive wires, known as stator windings, carry current. These stator windings are not perfect conductors and, therefore, the current traveling through them generates heat within the slots.

The heat generated by the stator windings causes the temperature of the motor's constituent materials to rise. As the temperature of the constituent materials rise, the properties of those materials degrade. For example, the energy product of the magnets used decreases as the temperature increases. Thereby, the generated heat causes a decrease in the motor's continuous load rating. Furthermore, the materials used to insulate the windings can break down at higher temperatures and the life of the insulating materials will decrease.

The decreased performance is more pronounced in motors with large-area slots. The generated heat dissipates along a path from the windings to the lamination iron and motor housing. Thus, the heat generated nearer to the slot's center does not dissipate as easily as that nearer to its boundary since the heat path is longer. Accordingly, the temperature near the slot center rises above the average temperature of the windings The greater the distance that the slot center is from the slot boundary, that is, the larger the slot area, the greater this temperature difference (called the hot spot temperature) becomes This hot spot temperature limits the motor's continuous load rating because the current in the windings must be limited so that the insulation temperature rating is not exceeded.

Despite the above-mentioned problems, electric motors are still designed with large area slots for various reasons, including the reduced manufacturing cost due to the small number of stator slots. However, for the motors with large area slots there is a need to improve the continuous load rating by improving the heat transfer from the stator windings to the motor housing.

SUMMARY OF THE INVENTION

It is an object of this invention to improve the heat transfer from the stator windings to the motor housing.

Another object of this invention is to reduce the hot spot temperature in the stator windings.

A further object of this invention is to increase the continuous horsepower rating of an electric motor which contains large area stator slots.

In a accordance with the instant invention, an electric motor includes a heat spike within the stator slots which extends radially inward from the stator back iron into the slot between the stator teeth. The heat spike, placed within the stator slots, reduces the heat path length and increases the heat transfer areas to the iron. Together, these allow the winding heat to dissipate quicker, and thereby, reduce the hot spot temperature and improve the motor's load rating.

BRIEF DESCRIPTION OF THE DRAWINGS

The following drawings, along with the detailed description, serve to illustrate a preferred embodiment of the invention wherein.

DETAILED DESCRIPTION OF A PREFERRED EMBODIMENT

Figure 1:
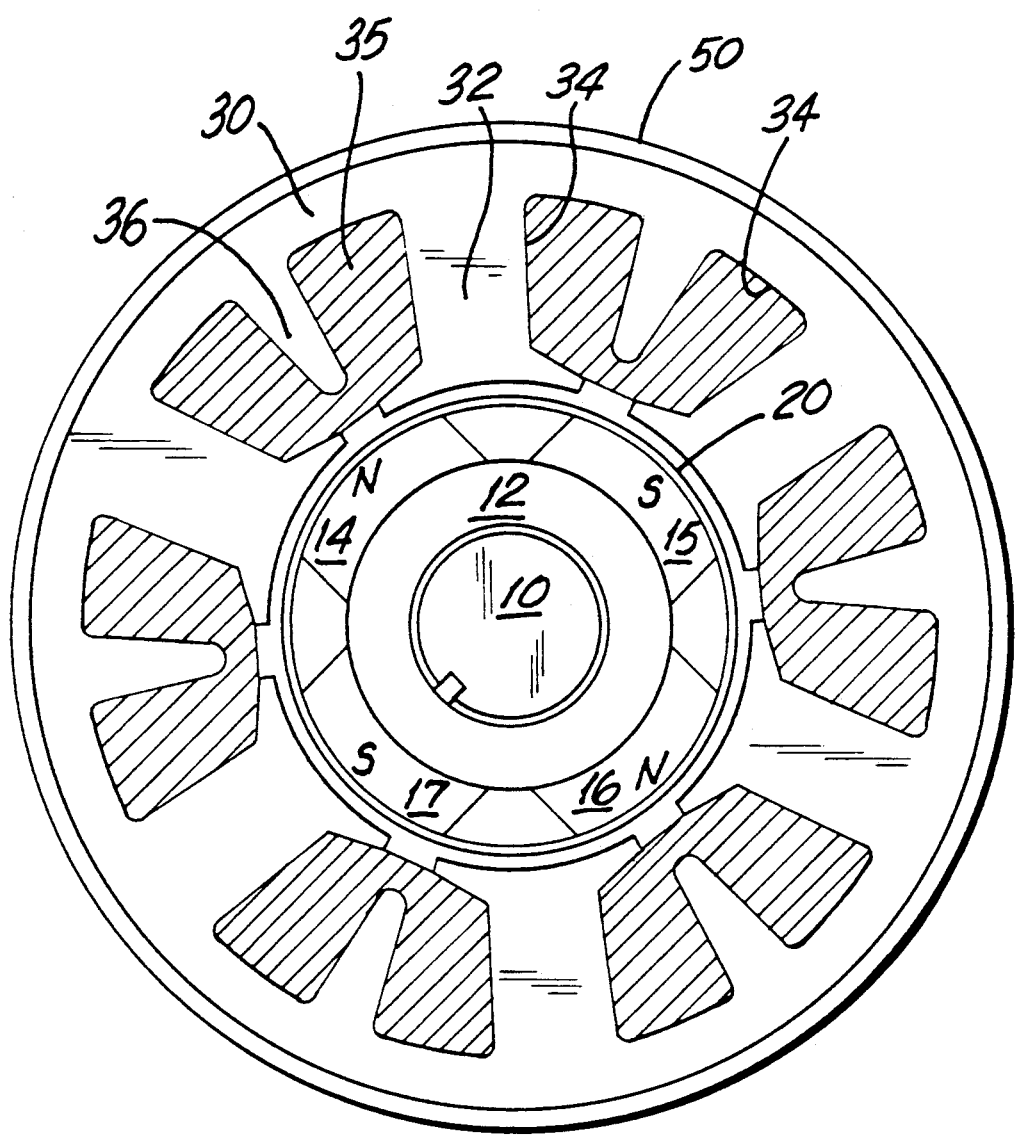
FIG. 1 is a cross-sectional end view of a motor according to the invention.
Figure 2:
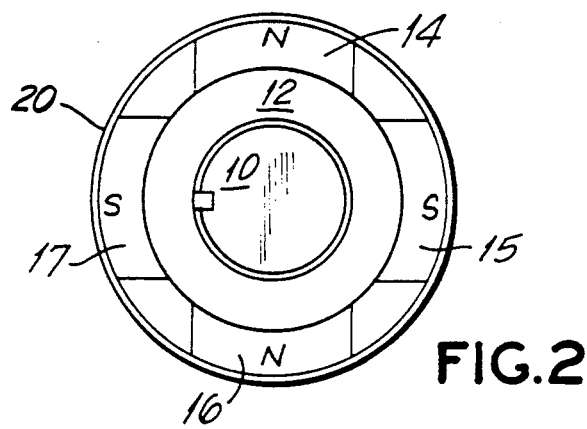
FIG. 2 is an end view of the rotor portion of the motor.
Figure 3:
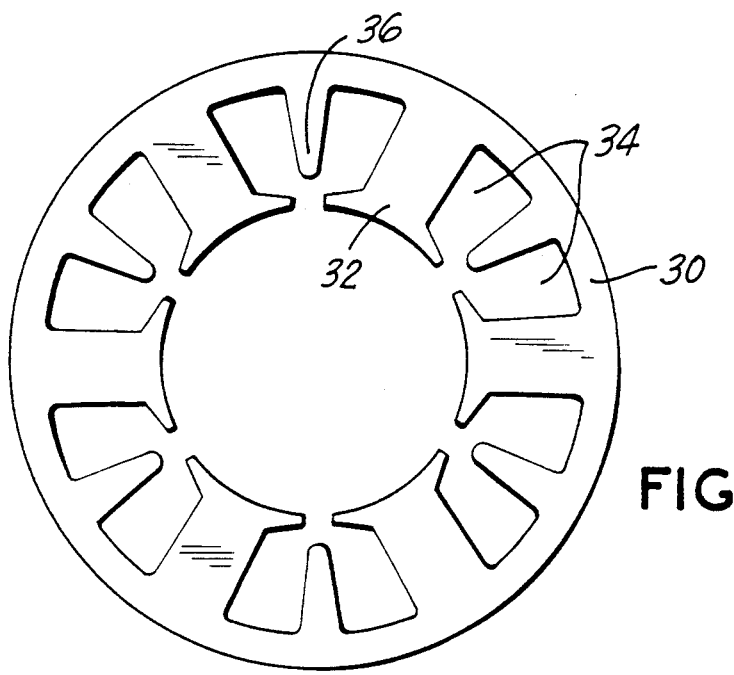
FIG. 3 is a view of the motor stator lamination with heat spikes in accordance with the instant invention.

The basic structure of a motor according to the invention is shown in FIGS. 1-3. Those elements of electric motors well known to those skilled in the art will not be described herein as they do not comprise essential elements of the invention.

An electric motor according to the invention includes a steel shaft 10 surrounded by a cylindrical iron sleeve 12 which provides the back iron for the rotor. Four permanent magnets 14, 15, 16, and 17 are mounted on and extend radially outward from the sleeve 12. The magnet assembly may be arranged to provide alternating north and south poles as shown in FIG. 1.

To hold the magnets in place under high speed centrifugal force, a banding 20 surrounds the rotor structure. Banding is typically accomplished by first dipping high strength Kevlar filaments in epoxy and then winding these around the rotor. The banding 20 may include one or more helical layers followed by several hoop layers.

Each magnet used can extend the full length of the rotor or, alternatively, they can be segmented. An advantage to using segmented magnets is that a single motor design can provide motors with different horsepower ratings simply by changing the motor length and the number of magnet segments.

Figure 4:
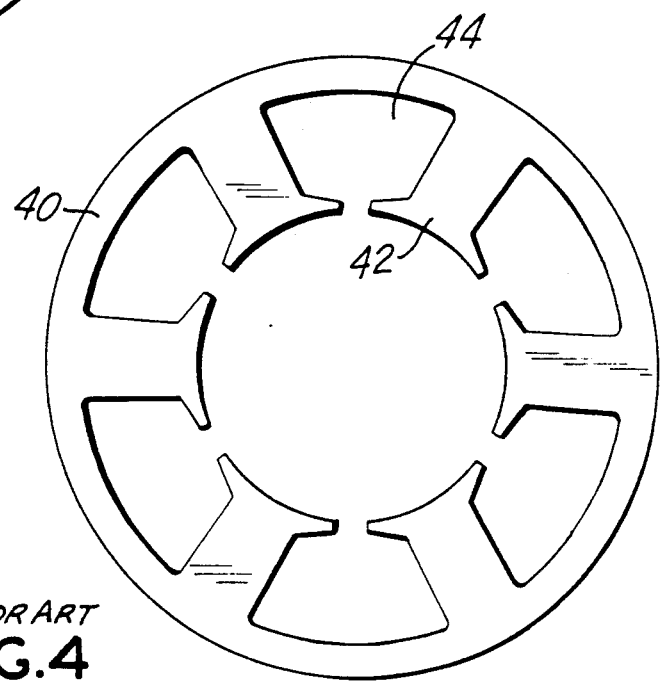
FIG. 4 is a view of a motor stator lamination without heat spikes.

In contrast to the conventional stator in FIG. 4, the stator in FIG. 3, in accordance with the instant invention, has a heat spike 36 added into each slot 34 (six (6) in number). Each heat spike 36 is located at the approximate midpoint of the slot 34 arc along the stator shell 30 between teeth 32. The heat spike 36 is widest at its base because the closer it is to the stator shell 30, the more heat it has to conduct. The heat spike 36 extends radially into each slot 34 and becomes narrower at its end opposite from the stator shell 30. The housing 50 supports the entire motor and dissipates most of the heat to the surrounding medium.

In addition to the heat spike 36, the stator in FIG. 3 includes other important differences from the conventional stator in FIG. 4. To provide space for the heat spike, a trade off between slot area for the winding and stator teeth area for the magnetic flux must be balanced.

To accommodate the heat spike in the stator slot, either the winding slot areas or the back iron areas must be reduced. While conventional slotted stator designs suggest that reducing these areas would reduce the motor's performance, it has been found that the improved heat transfer from the addition of the heat spike, in thermal contact with windings 35, more than compensates for the reduced winding or stator tooth areas. In fact, instead of reducing motor performance, motor performance is actually improved.

Electric motors built according to this invention have increased horsepower and have shown a reduction in the hot winding spot temperature. Additionally, electric motors built according to this invention have shown a 7.38% increase in horsepower and have shown a reduction in the winding hot spot temperature from 19° C. to 2.2° C. above the average winding temperature as compared with an electric motor run at the same speed but without stator heat spikes.

Although only one illustrative embodiment of the invention has been described in detail, there are many variations that come within the scope of the invention. Accordingly, the invention is to be limited only as particularly defined in the appended claims.

I claim:

1. An electric motor comprising:
   a stator being a stationary wound member; a rotor being a movable field member, the magnetic field of said rotor interacting with energized windings of said stator, causing said rotor to move relative to said stator;
   a plurality of stator slots, each stator slot having one elongated solid heat spike of thermal conductive material said heat spikes each extended radially inward from the stator adjacent to said windings to at least the midpoint of the stator slot area, each heat spike substantially centered around the midpoint of slot arc along the stator shell, such that said heat spikes are widest when farther away from said rotor and said heat spikes are narrowest when closer to said rotor; and support means for maintaining an air gap between said stator and said rotor.

2. An electric motor comprising:
   a stator having windings and a plurality of stator slots;
   a rotor;
   a plurality of elongated solid heat spikes of thermal conductive material for increasing the horsepower of said motor by 5% or more, each of said stator slots having one of said heat spikes of thermal conductive material, said heat spikes each extended radially inward from the stator to at least the midpoint of the stator slot area said heat spikes adjacent to said stator windings, each heat spike substantially centered around the midpoint of slot arc along the stator shell such that said heat spikes are widest when farther away from said rotor and said heat spikes are narrowest when closer to said rotor; and support means for maintaining an air gap between said stator and said rotor.

3. In an electric motor having a stator and a rotor a method of heat reduction of at least 50% in the stator winding hot spot temperature comprising the steps of:
   providing a plurality of stator slots in said stator;
   providing a plurality of elongated solid heat spikes of thermal conductive material within said stator slots, said heat spikes in thermal contact with stator windings such that said heat spikes are widest when farther away from said rotor and narrowest when closer to said rotor;
   extending each of said heat spikes radially inward from the midpoint of slot arc along the stator shell into each of said stator slots to at least the midpoint of the stator slot area; and maintaining an air gap between said stator and said rotor by providing support means.

* * * * *